United States Patent Office

2,798,094
Patented July 2, 1957

2,798,094

ALPHA, OMEGA-DI-SUBSTITUTED ALKANES

Edwin R. Shepard and Koert Gerzon, Indianapolis, Ind., assignors to Eli Lilly and Company, Indianapolis, Ind., a corporation of Indiana No Drawing. Continuation of application Serial No. 344,900, March 26, 1953. This application September 13, 1956, Serial No. 609,558

7 Claims. (Cl. 260—570.9)

This invention relates to substituted diamines and more particularly to α,ω-bis-(oxybenzyl-alkyl-aralkylamino)

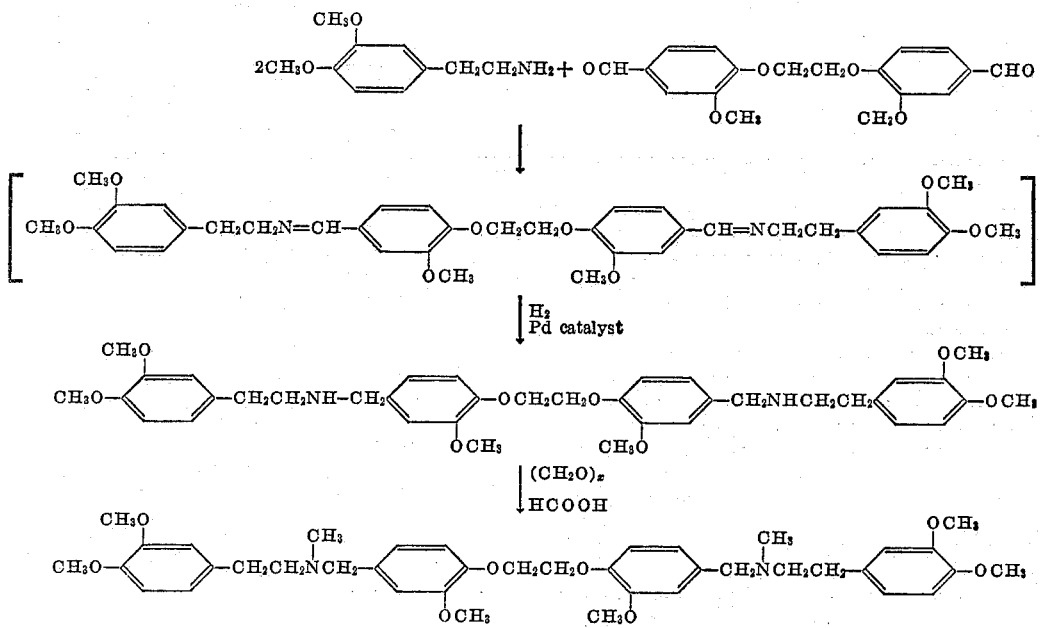

substituted alkanes, their acid addition salts and the processes for their preparation.

The bases of the compounds of the invention can be represented by the formula:

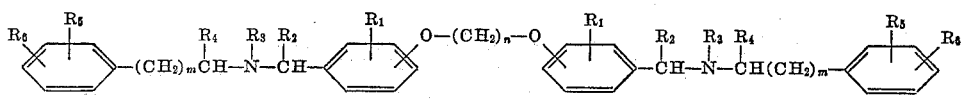

wherein each $R_1$ represents hydrogen or a lower alkoxy radical, each $R_2$ represents hydrogen or a lower alkyl radical, each $R_3$ represents a lower alkyl radical, each $R_4$ represents hydrogen or a lower alkyl radical, each $R_5$ represents hydrogen or a lower alkoxy radical, each $R_6$ represents hydrogen, a lower alkyl radical or a lower alkoxy radical, $m$ represents an integer from 0 to 2 and $n$ represents an integer from 2 to 6. The bases are generally solids which are insoluble in water and somewhat soluble in most organic solvents; the acid addition salts such as the mineral acid salts of the bases are generally somewhat water soluble, but as a rule are substantially insoluble in the typical organic solvents.

The new α,ω-substituted alkanes and their acid solution salts are amebicides, and when administered orally or parenterally alone or in combination with pharmaceutical extending media are useful for veterinary and human administration to bring about the control or cure of amebic infection.

Illustratively the new compounds can be prepared by condensing a suitably substituted 1,2-bis-(4′-formylphenoxy) alkane with a substituted aralkylamine to form an intermediate double Schiff's base, which is reduced with hydrogen catalyzed by palladium on charcoal, to give the corresponding secondary diamine. The substituted diamine is alkylated, as by treating with an aldehyde in the presence of an acid, followed by the addition of dilute alkali, to form the desired di-tertiary amine. The following series of equations setting forth the preparation of 1,2-ethane bis-(4′-oxy-3′-methoxybenzyl-methyl-homoveratryl-amine) will serve to indicate the course of the reactions:

As noted hereinabove, the α,ω-substituted alkanes of the invention contain two basic nitrogen atoms which form acid addition salts with inorganic and organic acids. Examples of the inorganic acids suitable for the preparation of acid addition salts are the common mineral acids, e. g. hydrochloric, nitric, sulfuric, and phosphoric acids; examples of organic acids capable of forming acid addition salts with the bases of the invention are acetic, propionic, tartaric, benzoic, salicylic, maleic and the like acids. The acid addition salts of the novel bases of the invention are readily prepared by methods known to the art, as for example, by interreaction of stoichiometrically equivalent amounts of the selected base and an acid in mutual inert solvent solution. The preferred acid addition salts are the pharmaceutically useful salts, i. e., those salts which are not materially more toxic than the bases from which they are derived and which are suitable for incorporation into various pharmaceutical preparations useful for therapeutic application.

This application is a continuation of our prior copending application for patent, Serial No. 344,900, filed March 26, 1953, now abandoned.

The following examples illustrate the preparation and physical properties of representative substituted α,ω-alkane bis-(oxybenzyl-alkyl-aralkylamine) compounds of the invention.

Example 1

1,2-ethane bis-(4'-oxybenzyl-methyl-4''-isopropylbenzyl-amine) dihydrochloride.

To a suspension of 18 g. of ethylene glycol-bis-(4-formylphenyl ether), prepared by the method of Neish, Rec. trav. chim. Pays-bas, 66, 433, (1947), in 200 cc. of ethanol in a reduction flask were cautiously added 2 g. of palladium on charcoal. The suspension was heated on a steam bath to about 60° C. and maintained at that temperature for about ten minutes. 22.4 g. of p-isopropyl-benzylamine were added to the reaction mixture and the mixture, containing the intermediate double Schiff's base, was reduced with hydrogen in an Adams apparatus, with heating by means of an infrared lamp. The reduction with hydrogen was completed within about thirty minutes, and the reaction mixture was filtered hot to remove the catalyst. On cooling, 1,2-ethane bis-(4'-oxybenzyl-4''-isopropylbenzylamine) crystallized and was removed by filtration, washed with alcohol and dried. Upon recrystallization from ethanol, 1,2-ethane bis-(4'-oxybenzyl-4''-isopropylbenzylamine) melted at about 103–104° C.

*Analysis.*—Calculated for $C_{38}H_{48}N_2O_2$: N, 4.97. Found: N, 4.99.

To a well stirred, cooled mixture of 20 ml. of 37 percent aqueous formaldehyde solution and 45 ml. of 90 percent formic acid were added 11.3 g. of 1,2-ethane bis-(4'-oxybenzyl-4''-isopropylbenzylamine) in small portions. The solution was heated for one-half hour on the steam bath and finally for two hours at reflux temperature. The cooled solution was poured into 200 ml. of ice water with stirring. About 30 cc. of iced 20 percent aqueous sodium hydroxide solution were added with stirring. The precipitate, comprising the 1,2-ethane bis-(4'-oxybenzyl-methyl-4''-isopropylbenzylamine) formed in the reaction, was removed by filtration and dried in a desiccator over solid potassium hydroxide. The dried material was recrystallized from a mixture of ether and petroleum ether. 1,2-ethane bis-(4' - oxybenzyl-methyl-4''-isopropylbenzylamine) melts at about 75–76° C.

*Analysis.*—Calculated for $C_{40}H_{52}N_2O_2$: C, 81.01; H, 8.76; N, 4.72. Found: C, 81.01; H, 8.36; N, 4.79.

Dry hydrogen chloride gas was passed into a solution of 5 g. of 1,2-ethane bis-(4'-oxybenzyl-methyl-4''-isopropylbenzylamine) in 50 ml. of acetone until precipitation was completed. The 1,2-ethane bis-(4'-oxybenzyl-methyl-4''-isopropylbenzylamine) dihydrochloride formed was removed by filtration, and upon recrystallization from boiling water melted at about 238–240° C.

*Analysis.*—Calculated for $C_{40}H_{52}N_2O_2 \cdot 2HCl$: Cl, 10.66. Found: Cl, 10.20.

Example 2

1,2-ethane bis-(4'-oxybenzyl-methyl-β-phenethylamine) dihydrochloride.

To a solution of 27 g. of 1,2-bis-(4'-formylphenoxy) ethane, prepared by the method of Neish, Rec. trav. chim. Pays-bas, 66, 433 (1947), in 150 ml. of hot pyridine were added 24.2 g. of β-phenethylamine. The reaction mixture was placed in an Adams apparatus together with 3 g. of 5 percent palladium on charcoal catalyst. After about 5 lbs. more hydrogen had been absorbed than required by theoretical considerations, the hot solution was filtered, the solvent was removed by evaporation in vacuo and the residue was crystallized from ethanol. After recrystallization from petroleum ether, 1,2-ethane bis-(4'-oxybenzyl-β-phenethylamine) thus prepared melted at about 109.5–110.5° C.

*Analysis.*—Calculated for $C_{32}H_{36}N_2O_2$: C, 80.00; H, 7.50; N, 5.83. Found: C, 80.20; H, 7.52; N, 5.92.

To a mixture of 20 ml. of 37 percent formalin and 45 ml. of 90 percent formic acid were added 36 g. of 1,2-bis-(4'-oxybenzyl - β - phenethylamine) under cooling. After the initial spontaneous reaction had subsided, the mixture was refluxed for about two hours. The 1,2-bis-(4'-oxybenzyl-methyl-β-phenethylamine) formed in the reaction was recovered by pouring the reaction mixture into about 200 ml. of cold aqueous 5 percent sodium hydroxide. On recrystallization from petroleum ether, the 1,2-ethane bis - (4'-oxybenzyl-methyl-β-phenethylamine) melted at about 70.5–71° C.

*Analysis.*—Calculated for $C_{34}H_{40}N_2O_2$: C, 80.40; H, 7.87. Found: C, 80.41; H, 8.02.

Anhydrous hydrogen chloride was passed through a solution of 5 g. of 1,2-ethane bis-(4'-oxybenzyl-methyl-β-phenethylamine) dissolved in 50 ml. of hot absolute ethanol. Sufficient ether was added to the solution to bring about complete precipitation, and the solid salt was removed by filtration. On recrystallization from a mixture of ethanol and ether, 1,2-ethane bis-(4'-oxybenzyl-methyl-β-phenethylamine) dihydrochloride melted at about 220–231° C. with decomposition.

*Anaylsis.*—Calculated for $C_{34}H_{40}N_2O_2 \cdot 2HCl$: C, 70.23; H, 7.29; Cl, 12.18; N, 4.82. Found C, 70.25; H, 7.32; Cl, 11.74; N, 4.96.

Example 3

1,2-ethane bis-(3'-methoxy-4'-oxybenzyl-methyl-homo-veratrylamine) dihydrochloride.

A mixture of 123.5 g. of ethylene bromide, 220 g. of vanillin, 500 ml. of water, and 500 ml. of methylcellosolve was brought to refluxing while stirring, and a solution of 52.5 g. of sodium hydroxide in 250 ml. of water was added in the course of about one hour. Refluxing and stirring were continued for about four hours, whereupon the reaction mixture was cooled; thereupon a precipitate of 1,2-bis-(4'-formyl-2'-methoxyphenoxy) ethane formed, and was filtered off, washed with water and dried. Upon recrystallization from methylcellosolve, 1,2 - bis - (4'-formyl-2'-methoxyphenoxy) ethane melted at about 186–187° C.

A mixture of 16.5 g. of 1,2-bis-(4'-formyl-2'-methoxyphenoxy) ethane, 18.1 g. of homoveratrylamine and 100 ml. of methylcellosolve was heated to dissolve the solid. Three grams of 5 percent palladium on charcoal catalyst were added and the reaction mixture was placed in an Adams apparatus and hydrogenated while heating with an infrared lamp. After the hydrogenation was completed, the catalyst was removed from the reaction mixture by filtration. The solution was evaporated in vacuo and the residue, comprising 1,2-ethane bis-(3'-methoxy-4'-oxybenzyl-veratrylamine) formed in the reaction, was recrystallized from methanol and found to melt at about 113–115° C.

*Analysis.*—Calculated for $C_{38}H_{48}N_2O_8$: C, 69.09; H. 7.27. Found: C, 69.16; H, 7.05.

A mixture of 15.0 g. of 37 percent formalin and 18.6 g. of 30 percent formic acid was cooled while 42.8 g. of 1,2-ethane bis-(3'-methoxy-4'-oxybenzyl-veratrylamine) were added thereto. After the initial spontaneous reaction had subsided, the reaction mixture was brought to boiling and maintained under refluxing for about three hours. The reaction mixture was poured into about 100 ml. of a cold aqueous 5 percent sodium hydroxide solution. An oil comprising 1,2-ethane bis-(3'-methoxy-4'-oxybenzyl-methyl-homoveratrylamine) formed in the reaction separated as an oil. On standing overnight, the oil crystallized. After two recrystallizations from methylcellosolve and ethanol, the 1,2-ethane bis-(3'-methoxy-4'-oxybenzyl - methyl - homoveratrylamine) monohydrate melted at about 136–139° C.

*Analysis.*—Calculated for $C_{40}H_{52}N_2O_8 \cdot 1H_2O$: C, 69.76; H, 7.56. Found: C, 69.55; H, 7.47.

Five grams of 1,2-ethane bis-(3'-methoxy-4'-oxybenzyl-methyl-homoveratrylamine) were suspended in 50 ml. of ethanol and 10 ml. of water; and 5 ml. of concentrated hydrochloric acid were added thereto. Ether was added to the reaction mixture until precipitation was completed. The 1,2-ethane bis-(3'-methoxy-4'-oxybenzyl-methyl-homoveratrylamine) dihydrochloride monohydrate thus formed was recrystallized from a mixture of alcohol, water and ether, and was found to melt at about 209–225° C. with decomposition.

Analysis.—Calculated for $C_{40}H_{52}N_2O_6 \cdot 2HCl \cdot 1H_2O$: C, 61.60; H, 6.98; Cl, 9.09. Found: C, 61.83; H, 7.03; Cl, 8.90.

Example 4

1,4 - butane bis - (3' - methoxy - 4' - oxybenzyl - ethyl-γ-phenylpropylamine) dihydrochloride.

A mixture of 110 g. of tetramethylenedibromide, 170 g. of vanillin, 500 ml. of methylcellosolve, and 400 ml. of water was brought to refluxing while stirring. A solution of 41 g. of sodium hydroxide in 225 ml. of water was added to the refluxing mixture over a period of about twenty minutes. Heating and refluxing were continued for five minutes and then one liter of water was added to the reaction mixture. On chilling in an ice bath, 1,4-bis-(4'-formyl-2'-methoxyphenoxy) butane precipitated and was removed by filtration. After recrystallization from methylcellosolve with the addition of water to the hot solution until incipient precipitation, 1,4-bis-(4'-formyl-2'-methoxy-phenoxy) butane melted at 157.5–159° C.

A mixture of 17.9 g. of 1,4-bis-(4'-formyl-2'-methoxyphenoxy) butane, 9 g. of ethylamine, 1 g. of 5 percent palladium on charcoal catalyst and 100 ml. of methylcellosolve was warmed for about one-half hour. The mixture was then placed in an Adams apparatus and hydrogenated. Upon completion of hydrogenation and cooling, the catalyst was removed by filtration and the methylcellosolve was evaporated in vacuo. The residue, comprising the 1,4-butane bis-(3'-methoxy-4'-oxybenzyl-ethylamine) formed in the reaction, was recrystallized twice from a mixture of petroleum ether and benzene, and was found to melt at 69.5–70° C.

Analysis.—Calculated for $C_{40}H_{52}N_2O_4$: N, 6.73. Found: N, 6.98.

A mixture of 20 g. of 1,4-butane bis-(3'-methoxy-4'-oxybenzyl-ethylamine), 50 ml. of water, 50 ml. of methylcellosolve, 5.1 g. of sodium carbonate, and 20.2 g. of γ-phenylpropylbromide was refluxed vigorously for about sixteen hours. The reaction mixture was diluted with one liter of water, 25 ml. of a 50 percent aqueous sodium hydroxide solution was added, and the 1,4-butane bis-(3'-methoxy-4'-oxybenzyl-ethyl-γ-phenylpropylamine) formed in the reaction was extracted with three successive 500 ml. portions of ether. The combined ether extracts were dried over anhydrous magnesium sulfate and dry hydrogen chloride gas was passed into the solution until precipitation was complete. The precipitate was removed by filtration and crystallized from a mixture of acetone and ether followed by a second recrystallization from alcohol and ether. 1,4-butane bis-(3'-methoxy-4'-oxybenzylethyl - γ - phenylpropylamine) dihydrochloride hemihydrate thus prepared melted at about 132–135° C.

Analysis.—Calculated for $C_{42}H_{56}N_2O_4 \cdot 2HCl \cdot 1/2H_2O$: C, 68.65; H, 8.10. Found: C, 68.83; H, 8.06.

To a suspension of 7.8 g. of 1,4-butane bis-(3'-methoxy-4'-oxybenzyl-ethyl-γ - phenylpropylamine) dihydrochloride in 25 ml. of water was added 12 ml. of 10 percent aqueous sodium hydroxide, with vigorous agitation. The mixture was extracted with three successive 50 ml. portions of chloroform. The combined chloroform extracts were dried over anhydrous magnesium sulfate, and the solvent was removed by evaporation in vacuo. The residue was 1,4-butane bis-(3'-methoxy-4'-oxybenzyl-ethyl-γ-phenylpropylamine).

Example 5

1,2-ethane bis-(3'-methoxy-4'-oxybenzyl - methyl - β-phenylisopropylamine) dihydrochloride.

A mixture of 4 g. of β-phenylisopropylamine, 5 g. of 1,4-bis-(4'-formyl-2'-methoxy-phenoxy) ethane (prepared according to the procedure of Example 3), and 150 ml. of methyl cellosolve was refluxed for about four hours. The solvent was removed by evaporation in vacuo, and the oily residue consisting of the double Schiff's base formed in the reaction was dissolved in about 50 ml. of ethanol and hydrogenated in an Adams apparatus, using 0.5 g. of 5 percent palladium on carbon catalyst while heating by means of an infrared lamp. After cooling, the catalyst was removed by filtration and dry hydrogen chloride gas was bubbled through the alcohol solution until no further precipitation occurred. The solid was removed by filtration and recrystallized twice from ethanol.

1,2-ethane bis-(3'-methoxy-4'-oxybenzyl-β-phenylisopropylamine) dihydrochloride thus prepared melted at about 248–250° C.

Analysis.—Calculated for $C_{36}H_{46}N_2O_4 \cdot 2HCl$: C, 67.16; H, 7.52. Found: C, 66.86; H, 7.34.

The 1,2-ethane bis-(3'-methoxy-4'-oxybenzyl-β-phenylisopropylamine) dihydrochloride was suspended in 100 ml. of water and a slight excess of cold aqueous 10 percent sodium hydroxide was added to liberate the free base. The aqueous mixture was extracted with three 100 ml. portions of benzene. The combined extracts were dried over anhydrous magnesium sulfate and the benzene was removed by evaporation in vacuo. The residual 1,2-ethane bis-(3'-methoxy-4'-oxybenzyl-β-phenylisopropylamine) base was used directly for further procedural steps.

To a cooled, stirred mixture of 10 ml. of 37 percent aqueous formaldehyde solution and 20 ml. of 90 percent formic acid were added 6 g. of 1,2-ethane bis-(3'-methoxy-4'-oxybenzyl-β-phenylisopropylamine) in small portions. The solution was heated for about one-half hour on a steam bath and finally was refluxed for about two hours. The cooled solution was poured into 100 ml. of ice water with stirring, and about 15 ml. of iced 20 percent aqueous sodium hydroxide were added. The resulting precipitate was removed by filtration, and consisted of 1,2-ethane bis-(3'-methoxy-4'-oxybenzyl-methyl-β-phenylisopropylamine).

The base was dissolved in about 50 ml. of acetone, and dry hydrogen chloride gas was bubbled into the acetone solution until no further precipitation took place. The 1,2-ethane bis-(3'-methoxy-4'-oxybenzyl-methyl-β-phenylisopropylamine) dihydrochloride which formed was removed by filtration, and upon recrystallization from boiling water melted at about 238–240° C.

Analysis.—Calculated for $C_{38}H_{52}N_2O_4 \cdot 2HCl$: Cl, 10.58. Found: Cl, 10.44.

Example 6

The procedure of Example 1 was followed, except that benzylamine was used instead of p-isopropylbenzylamine.

The 1,2-ethane bis-(4'-oxybenzyl-methyl-benzylamine) dihydrochloride thus prepared melted at about 213–215° C.

Analysis.—Calculated for $C_{32}H_{36}O_2N_2 \cdot 2HCl$: Cl, 12.81. Found: Cl, 13.00.

Example 7

The procedure of Example 1 was followed except that p-2-pentylbenzylamine was used instead of p-isopropylbenzylamine.

The dihydrochloride salt of 1,2-ethane bis-(4'-oxybenzyl-methyl-4''-2-pentylbenzylamine) thus prepared melted at about 211–212° C.

Analysis.—Calculated for $C_{42}H_{56}N_2O_2 \cdot 2HCl$: Cl, 10.23. Found: Cl, 10.01.

Example 8

The method of Example 1 was repeated, using veratrylamine instead of p-isopropylbenzylamine.

1,2-ethane bis-(4'-oxybenzyl-methyl-veratrylamine) dihydrochloride thus prepared melted at about 257–258° C.

*Analysis.*—Calculated for $C_{36}H_{44}N_2O_6 \cdot HCl$: C, 64.22; H, 6.88; Cl, 10.59. Found: C, 63.95; H, 6.75; Cl, 10.62.

Example 9

The procedure of Example 3 was followed except that veratrylamine was employed in place of homoveratrylamine.

The 1,2-ethane bis-(3'-methoxy-4'-oxybenzyl-methyl-veratrylamine) dihydrochloride formed in the process melted at about 230° C.

*Analysis.*—Calculated for $C_{38}H_{48}N_2O_8 \cdot 2HCl$: C, 62.24; H, 6.87; Cl, 9.67. Found: C, 62.33; H, 6.97; Cl, 9.67.

Example 10

The procedure of Example 1 was followed, except that p-isopropylphenethylamine was used in place of p-isopropyl-benzylamine.

The 1,2 - ethane bis-(4'-oxybenzyl-methyl-4''-isopropyl-phenethylamine) prepared by the process melted at about 75–76° C.

*Analysis.*—Calculated for $C_{40}H_{52}N_2O_2$: C, 81.01; H, 8.76; N, 4.72. Found: C, 81.01; H, 8.36; N, 4.79.

Example 11

The process of Example 3 was repeated, using benzylamine instead of homoveratrylamine.

The dihydrochloride salt of 1,2-ethane bis-(3'-methoxy-4' - oxybenzyl - methyl - benzylamine) melted at about 211–212° C.

*Analysis.*—Calculated for $C_{34}H_{40}N_2O_4$: Cl, 11.55. Found: Cl, 11.67.

Example 12

The procedure of Example 2 was repeated, using p-methoxy-β-phenethylamine instead of β-phenethylamine.

1,2 - ethane bis - (4' - oxybenzyl-methyl-4''-methoxy-β-phenethylamine) dihydrochloride thus prepared melted at about 237–239° C.

*Analysis.*—Calculated for $C_{36}H_{40}N_2O_4 \cdot 2HCl$: Cl, 11.14. Found: Cl, 10.83.

Example 13

The process of Example 2 was followed, except that homoveratrylamine was employed instead of β-phenethylamine.

1,2-ethane bis-(4' - oxybenzyl - methyl - homoveratrylamine) dihydrochloride thus prepared melted over a range of about 205–232° C.

*Analysis.*—Calculated for $C_{38}H_{48}N_2O_4 \cdot 2HCl$: N, 3.99. Found: N, 4.25.

Example 14

β-Phenethylamine was used in carrying out the process of Example 3, in place of homoveratrylamine.

1,2 - ethane bis - (3' - methoxy - 4'-oxybenzyl-methyl-β-phenethylamine) thus prepared melted at about 67–69° C.

*Analysis.*—Calculated for $C_{36}H_{44}N_2O_4$: C, 76.00; H, 7.75. Found: C, 75.73; H, 7.79.

Example 15

The procedure of Example 3 was followed, except that p-methoxy-β-phenethylamine was used instead of homoveratrylamine.

1,2 - ethane bis - (3' - methoxy-4'-oxybenzyl-methyl-4''-methoxy-β-phenethylamine) dihydrochloride thus prepared melted at about 233–235° C.

*Analysis.*—Calculated for $C_{38}H_{48}N_2O_6 \cdot 2HCl$: Cl, 10.14. Found: Cl, 10.13.

Example 16

The process of Example 2 was repeated, using γ-phenylpropylamine in place of β-phenethylamine.

The dihydrochloride salt of 1,2-ethane bis-(4'-oxy-benzyl-methyl-γ-phenylpropylamine) prepared in this manner melted at about 194–195° C.

*Analysis.*—Calculated for $C_{36}H_{44}N_2O_2 \cdot 2HCl$: Cl, 11.95. Found: Cl, 11.74.

Example 17

The process of Example 1 was repeated, except that propylene glycol bis-(4-formylphenyl ether), prepared by the method of Neish, Rec. trav. chim. Pays-bas 66, 433, (1947), and benzylamine were used instead of ethylene glycol bis-(4-formylphenyl ether) and p-isopropylbenzylamine, respectively.

1,3-propane bis-(4'-oxybenzyl-methyl-benzylamine) dihydrochloride thus prepared melted at about 184–185° C.

*Analysis.*—Calculated for $C_{33}H_{38}N_2O_2 \cdot 2HCl$: Cl, 12.50; N, 4.93. Found: Cl, 11.89; N, 5.00.

Example 18

The process of Example 2 was repeated, except that propylene glycol bis-(4-formylphenyl ether) prepared by the method of Neish, supra, was used instead of 1,3-bis-(4'-formylphenoxy) ethane.

The 1,3-propane bis-(4'-oxybenzyl-methyl phenethylamine) dihydrochloride thus prepared melted at about 200–201° C.

*Analysis.*—Calculated for $C_{35}H_{42}N_2O_2 \cdot 2HCl$: Cl, 11.84. Found: Cl, 11.64.

Example 19

The procedure of Example 1 was repeated, except that propylene glycol bis-(4-formyl ether) was used instead of ethylene glycol bis-(4-formylphenyl ether), and p-isopropyl-β-phenethylamine was used instead of p-isopropylbenzylamine.

The 1,3-propane bis-(4'-oxybenzyl-methyl-4''-isopropyl-β-phenethylamine) dihydrochloride thus prepared melted at about 233–235° C.

*Analysis.*—Calculated for $C_{41}H_{54}N_2O_2 \cdot 2HCl$: Cl, 10.43. Found: Cl, 10.51.

Example 20

The process of Example 1 was carried out using propylene glycol bis-(4-formylphenyl ether) and γ-phenylpropylamine instead of ethylene glycol bis - (4 - formylphenyl ether) and p-isopropylbenzylamine, respectively.

1,3-propane bis-(4'-oxybenzyl-methyl-γ-phenylpropylamine) dihydrochloride thus prepared melted at about 123–128° C.

*Analysis.*—Calculated for $C_{39}H_{50}N_2O_4 \cdot 2HCl$: C, 67.47; H, 8.01. Found: C, 67.65; H, 8.31.

Example 21

A mixture of 103.5 g. of 1,3-dibromopropane, 170 g. of vanillin, 500 ml. of methylcellosolve and 400 ml. of water was refluxed while stirring. A solution of 41 g. of sodium hydroxide in 225 ml. of water was added to the refluxing mixture over a period of about one hour. Heating and refluxing were continued for about four hours and then the reaction mixture was poured into about one liter of ice water. The reaction mixture was chilled in an ice bath, and the 1,3-bis-(4'-formyl-2'-methoxy-phenoxy) propane which precipitated was removed by filtration. On recrystallization from alcohol-water solution, the 1,3-bis-(4'-formyl - 2' - methoxy-phenoxy) propane melted at about 147.5–148.5° C.

*Analysis.*—Calculated for $C_{19}H_{20}O_6$: C, 66.89; H, 5.81. Found: C, 66.12; H, 5.49.

The process of Example 3 was repeated, except that 1,3-bis-(4'-formyl - 2' - methoxy-phenoxy) propane was used instead of 1,2-bis-(4'-formyl-2'-methoxy-phenoxy) ethane.

1,3-propane bis-(3'-methoxy - 4' - oxybenzyl - methyl-homoveratrylamine) thus prepared melted at about 127–129° C.

*Analysis.*—Calculated for $C_{41}H_{54}N_2O_8$: C, 70.05; H, 7.74. Found: C, 70.33; H, 7.65.

1,3-propane bis-(3'-methoxy - 4' - oxybenzyl - methyl-homoveratrylamine) dihydrochloride sesquihydrate melted at about 164–170° C.

*Analysis.*—Calculated for C₄₁H₅₄N₂O₈·2HCl·1½H₂O: C, 61.34; H, 7.41. Found: C, 61.17; H, 7.22.

Example 22

The procedure of Example 2 was repeated, except that 1,4-bis-(4'-formylphenoxy) butane, prepared according to the method of Neish, Rec. trav. chim. Pays-bas, 66, 433, (1947), and benzylamine were used instead of 1,2-bis-(4'-formylphenoxy) ethane and β-phenethylamine.

The 1,4-butane bis-(4'-oxybenzyl-methyl-benzylamine) thus prepared melted at about 58–59° C.

*Analysis.*—Calculated for C₃₄H₄₀N₂O₂: N, 5.49. Found: N, 5.44.

Example 23

Example 2 was repeated, except that 1,4-bis-(4'-formylphenoxy) butane was used instead of 1,2-bis-(4'-formylphenoxy) ethane.

The dihydrochloride salt of 1,4 - butane bis - (4' - oxybenzyl-methyl-β-phenethylamine) prepared in this way melted at about 221–222° C.

*Analysis.*—Calculated for C₃₆H₄₄N₂O₂·2HCl: C, 70.93; H, 7.67; Cl, 11.63. Found: C, 70.67; H, 7.68; Cl, 11.80.

Example 24

The process of Example 3 was repeated, except that 1,4-bis - (4' - formyl - 2' - methoxy-phenoxy) butane and γ-phenylpropylamine were used instead of 1,2-bis-(4'-formyl-2'-methoxy-phenoxy) ethane and homoveratrylamine, respectively.

1,4-butane bis-(3'-methoxy - 4' - oxybenzyl - methyl-γ-phenylpropylamine) dihydrochloride.monoalcoholate thus prepared melted at about 203–212° C.

*Analysis.*—Calculated for

C₄₀H₅₂N₂O₄·2HCl·1C₂H₅OH:

C, 67.85; H, 8.14. Found: C, 67.96; H, 8.12.

Example 25

A mixture of 151 g. of pentamethylene dibromide, 220 g. of vanillin, 500 ml. of water and 700 ml. of methylcellosolve was brought to refluxing temperature and a solution of 52.5 g. of sodium hydroxide in 250 ml. of water was added over a period of about one hour while stirring. Refluxing and stirring were continued for an additional period of four hours. The reaction mixture was poured into about two liters of ice water. The resulting precipitate of 1,5-bis-(4'-formyl - 2' - methoxyphenoxy) pentane was removed by filtration, washed with water and recrystallized from absolute ethanol. 1,5-bis-(4'-formyl-2'-methoxy-phenoxy) pentane thus prepared melted at about 109–110° C.

*Analysis.*—Calculated for C₂₁H₂₄O₆: C, 67.7; H, 6.45. Found: C, 67.5; H, 6.34.

The procedure of Example 3 was repeated, using 1,5-bis-(4'-formyl-2'-methoxy-phenoxy) pentane instead of 1,2-bis-(4'-formyl-2'-methoxy-phenoxy) ethane.

The dihydrochloride salt of 1,5-pentane bis-(3'-methoxy-4'-oxybenzyl-methyl-homoveratrylamine) thus prepared melted at about 195–204° C.

*Analysis.*—Calculated for C₄₃H₅₈N₂O₈·2HCl: C, 64.24; H, 7.52. Found: C, 64.44; H, 7.50.

Example 26

1,2-ethane bis-(3'-methoxy-4'-oxybenzyl-methyl-homoveratrylamine) sulfate.

To a solution of 7.06 g. (0.01 mol) of 1,2-ethane bis-(3' - methoxy - 4' - oxybenzyl - methyl - homoveratrylamine), prepared according to the procedure of Example 3, in 50 ml. of cellosolve are added 10 ml. of M/1 H₂SO₄. The solution is thoroughly stirred, and evaporated to dryness in vacuo.

The residue from evaporation is 1,2-ethane bis-(3'-methoxy - 4' - oxybenzyl - methyl - homoveratrylamine) sulfate.

Similarly, the nitric, acetic, propionic and benzoic acid addition salts of 1,2-ethane bis-(3'-methoxy-4'-oxybenzyl-methyl-homoveratrylamine) are prepared by the addition of stoichiometrically equivalent amounts of nitric, acetic, propionic and benzoic acids to the solution of 1,2-ethane bis - (3' - methoxy - 4' - oxybenzyl - methyl - homoveratrylamine) followed by evaporation of the solvent.

1,2-ethane bis-(4'-oxybenzyl - methyl - 4'' - isopropyl-benzylamine), 1,2-ethane bis - 4' - oxybenzyl - methyl-β-phenethylamine), 1,4-butane bis-(3'methoxy-4'-oxybenzyl-ethyl-γ-phenylpropylamine) and 1,2-ethane bis-(3'methoxy-4'-oxybenzyl-methyl - β - phenyl-isopropylamine) are substituted for 1,2-ethane bis-(3'-methoxy-4'-oxybenzyl-methyl-homoveratrylamine) in the foregoing procedures. The sulfate, dinitrate, diacetate, dipropionate, and dibenzoate salts of the named compounds, respectively, are obtained.

Example 27

1,2 - ethane bis - (4' - oxy - α - ethylbenzyl - methyl-veratrylamine).

A mixture of 100 g. (0.66 mol) of p-hydroxypropiophenone, 60 g. (0.33 mol) of ethylene dibromide, 230 ml. of methyl cellosolve and 230 ml. of water was brought to boiling under reflux, while stirring. A solution containing 242 g. of sodium hydroxide in 115 ml. of water was slowly added to the boiling mixture over a period of about one hour. Stirring and refluxing were continued for about four hours, and the mixture was cooled, whereupon a precipitate of 1,2-ethane bis-(4'-oxypropiophenone) formed and was removed by filtration and washed with water. After recrystallization from a mixture of cellosolve and absolute ethanol, 1,2-ethane bis(4'-oxypropiophenone) melted at about 132–134° C.

*Analysis.*—Calculated for C₂₀H₂₂O₄: C, 73.60; H, 6.79. Found: C, 73.55; H, 6.83.

To a stirred solution of 58 g. (0.1 mol) of 1,2-ethane bis-(4'-oxypropiophenone) in a warmed mixture of 300 ml. of pyridine and 300 ml. of ethanol were added 60 g. (0.85 mol) of hydroxylamine hydrochloride, and the mixture was boiled under reflux for about sixteen hours. The solvents were partially removed by evaporation under reduced pressure, and upon cooling, a crystalline precipitate of 1,2-ethane bis-(4'-oxypropiophenone) dioxime was formed. After recrystallization from a large volume of ethanol, the dioxime melted at about 181–182° C.

*Analysis.*—Calculated for C₂₀H₂₄N₂O₄: N, 7.87. Found: N, 7.58.

The 1,2-ethane bis-(4'-oxypropiophenone) dioxime prepared as described hereinabove was dissolved in about 100 ml. of ethanol and about 5 g. of Raney nickel catalyst were added thereto. The ethanol solution was saturated with ammonia gas, and the dioxime was reduced with hydrogen at 100–110° C. under 2,000 lbs./sq. in. pressure in a hydrogenation apparatus. The mixture was filtered hot to remove the catalyst, and on cooling, a crystalline precipitate formed and was removed by filtration. After recrystallization from ethanol, the 1,2-ethane bis-(4'-oxy-α-ethylbenzylamine) thus prepared melted at about 79–80° C.

*Analysis.*—Calculated for C₂₀H₂₈N₂O₂: N, 8.54. Found: N, 9.08.

A solution of 15 g. of 1,2-ethane bis-(4'-oxy-α-ethylbenzylamine) and 17 g. of veratraldehyde in about 200 ml. of dry toluene was boiled under reflux in an apparatus containing a water separator. After refluxing for about five hours no more water separated and refluxing was continued for a further period of about twelve hours. The toluene was removed from the reaction mixture by evaporation in vacuo, and the residue was crystallized from ethanol. On recrystallization from ethanol the double Schiff's base formed in the reaction melted at about 142–143° C.

*Analysis.*—Calculated for $C_{38}H_{44}N_2O_6$: C, 73.08; H, 7.04. Found: C, 72.94; H, 6.96.

The double Schiff's base prepared as described hereinabove was dissolved in about 200 ml. of N-ethylmorpholine and about 2 g. of 5 percent palladium on charcoal catalyst were added. The mixture was placed in an Adams apparatus and reduced with hydrogen. The catalyst was removed from the reaction mixture by filtration, and the solvent was evaporated in vacuo. The residue was dissolved in about 50 ml. of hot ethanol, and upon cooling, a crystalline precipitate of 1,2-ethane bis-(4'-oxy-α-ethylbenzyl-veratrylamine) was formed. After crystallization from a mixture of ether and petroleum ether to which a few drops of methanol had been added, 1,2-ethane bis-(4'-oxy-α-ethylbenzyl-veratrylamine) melted at about 85–86° C.

*Analysis.*—Calculated for $C_{38}H_{48}N_2O_6$: C, 72.64; H, 7.70. Found: C, 72.60; H, 7.77.

To a well stirred, cooled mixture of 2.5 ml. of 37 percent aqueous formaldehyde solution and 5 ml. of 90 percent formic acid were added 1.5 g. of 1,2-ethane bis-(4'-oxy-α-ethylbenzyl-veratrylamine) in small portions. The solution was heated for about one-half hour on a steam bath and finally was boiled under reflux for about two hours. After cooling, the reaction mixture was poured into about 25 ml. of ice water, with stirring.

About 4 cc. of iced 20 percent aqueous sodium hydroxide solution were added with stirring, and a precipitate formed. The precipitate was removed by filtration, washed with ice water and dried in a desiccator over solid potassium hydroxide.

The 1,2-ethane bis-(4'-oxy-α-ethylbenzyl-methyl-veratrylamine) thus prepared was crystallized and recrystallized from ethanol, and melted at about 110–111° C.

*Analysis.*—Calculated for $C_{40}H_{52}N_2O_6$: C, 73.14; H, 7.98. Found: C, 73.00; H, 8.09.

We claim:

1. A member of the group consisting of organic bases and their acid addition salts, said bases being represented by the formula:

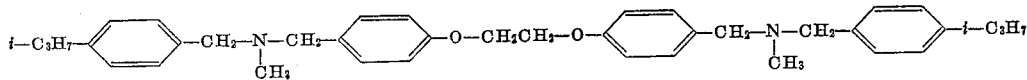

wherein $R_1$ is a member of the group consisting of hydrogen and lower alkoxy radicals, $R_2$ is a member of the group consisting of hydrogen and lower alkyl radicals, $R_3$ is a lower alkyl radical, $R_4$ is a member of the group consisting of hydrogen and lower alkyl radicals, $R_5$ is a member of the group consisting of hydrogen and lower alkoxy radicals, $R_6$ is a member of the group consisting of hydrogen, lower alkyl radicals and lower alkoxy radicals, $m$ is an integer from 0 to 2, and $n$ is an integer from 2 to 6.

2. 1,2-ethane bis-(4'-oxybenzyl-methyl-4''-isopropyl-benzylamine), represented by the formula:

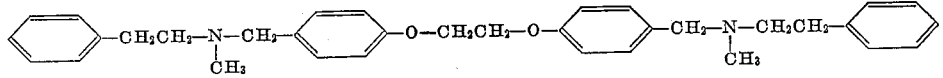

3. 1,2-ethane bis-(4'-oxybenzyl-methyl-β-phenethylamine), represented by the formula:

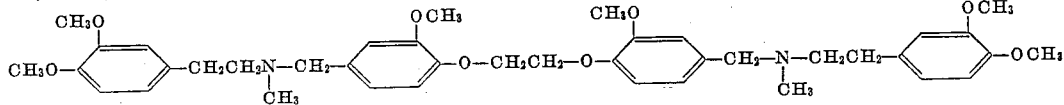

4. 1,2-ethane bis-(3'-methoxy-4'-oxybenzyl-methyl-homoveratrylamine), represented by the formula:

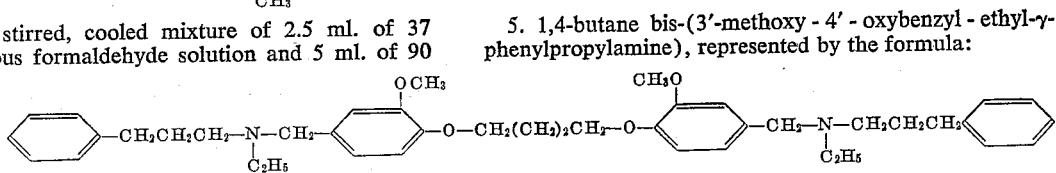

5. 1,4-butane bis-(3'-methoxy-4'-oxybenzyl-ethyl-γ-phenylpropylamine), represented by the formula:

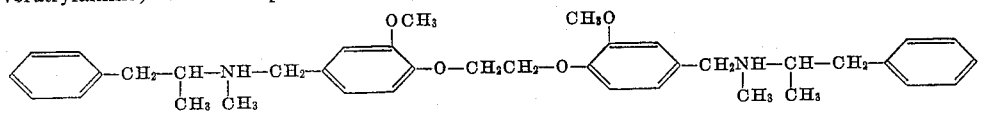

6. 1,2-ethane bis-(3'-methoxy-4'-oxybenzyl-methyl-β-phenylisopropylamine), represented by the formula:

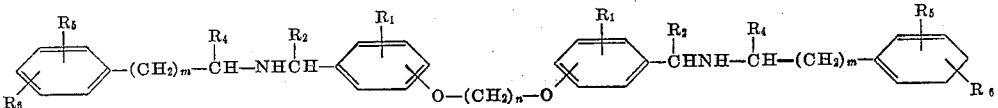

7. A member of the group consisting of organic bases and their acid addition salts, said bases being represented by the formula:

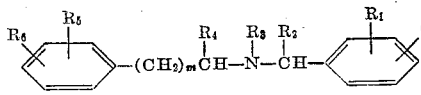

wherein $R_1$ is a member of the group consisting of hydrogen and lower alkoxy radicals, $R_2$ is a member of the group consisting of hydrogen and lower alkyl radicals, $R_4$ is a member of the group consisting of hydrogen and lower alkyl radicals, $R_5$ is a member of the group consisting of hydrogen and lower alkoxy radicals, $R_6$ is a member of the group consisting of hydrogen, lower alkyl radicals and lower alkoxy radicals, $m$ is an integer from 0 to 2, and $n$ is an integer from 2 to 6.

No references cited.